Figure 3:
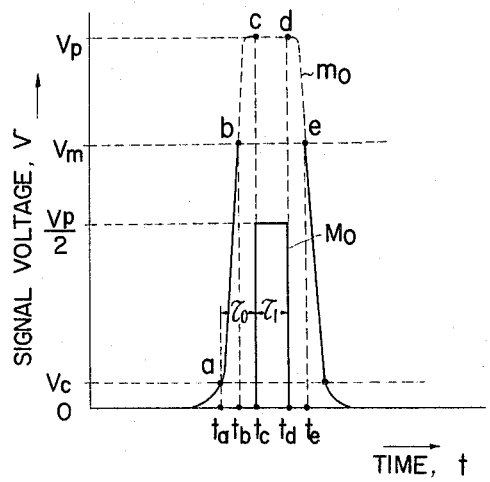

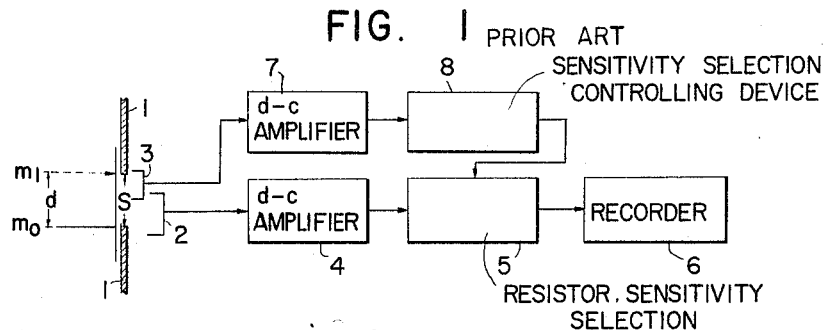
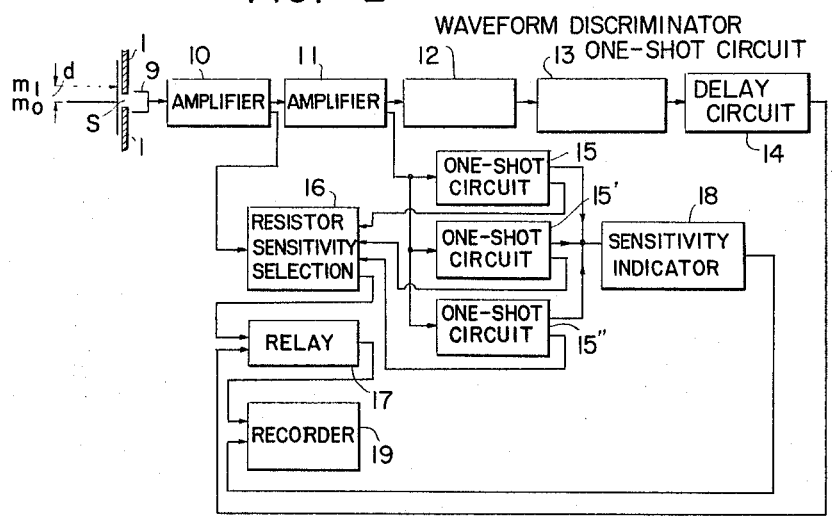
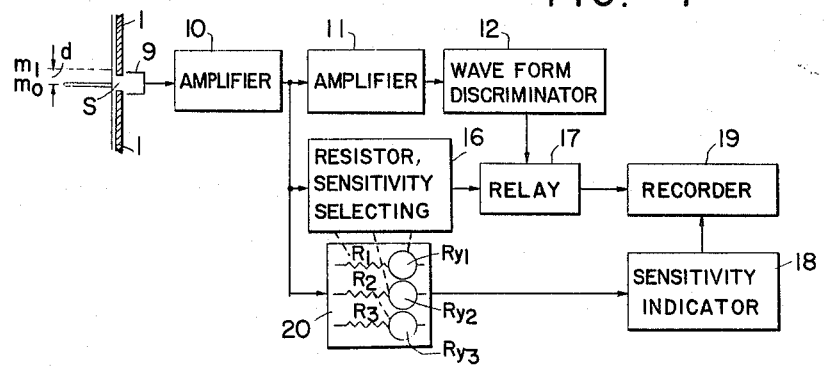

INVENTORS
Ichiro Omura
Masao Kuroda

BY

Western & Western

United States Patent Office 3,288,994
Patented Nov. 29, 1966

3,288,994
AUTOMATIC SENSITIVITY SELECTOR FOR A MASS SPECTROMETER MULTISCALE RECORDER USING A SINGLE ION COLLECTOR
Ichiro Omura, Kodaira-shi, and Masao Kuroda, Nerima-ku, Tokyo-to, Japan, assignors to Kabushiki Kaisha Hitachi Seisakusho, Tokyo-to, Japan, a joint-stock company of Japan
Filed Feb. 12, 1964, Ser. No. 344,276
Claims priority, application Japan, Feb. 13, 1963, 38/5,943, 38/5,944; Apr. 5, 1963, 38/17,211
5 Claims. (Cl. 250—41.9)

This invention relates to a novel and unique apparatus which can automatically select the recording sensitivity of the output of the ion collector in a mass spectrometer.

In the case when an unknown mass spectrum of an analysis sample is to be identified by means of a mass spectrometer, the sensitivity of the measuring circuit thereof is made extremely high in order to obtain sufficiently detailed analysis samples even for a spectrum portion for which the output of the ion collector is extremely small.

Moreover, when a comparatively large collector output signal has entered a measuring circuit with such a high sensitivity, the tip portion of the mass spectrum to be recorded will exceed the maximum scale of the recorder, whereby the details of said spectrum portion will become undiscernible. To avoid such an inconvenience, there has been adopted a recording system in which a high sensitivity is used when the output of the collector is small, whereas the recording is carried out with a low sensitivity when the collector output is large.

It is an object of the present invention, in its broad aspect, to overcome certain difficulties encountered in connection with sensitivity selectors of known type as will be described hereinafter in detail.

More specifically, it is an object to provide a new and unique automatic sensitivity selector of relatively simple construction and operation for mass spectrometers, said selector, with the use of a single ion collector, being capable of effectively accomplishing automatic selection of the recording sensitivity of the output of the ion collector even in the case of low degree of mass dispersion.

Figure 5:
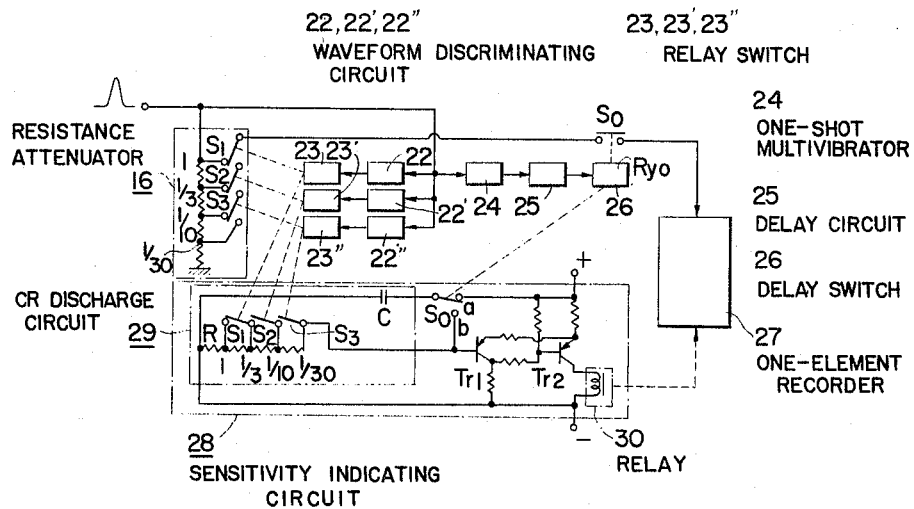
Figure 6:
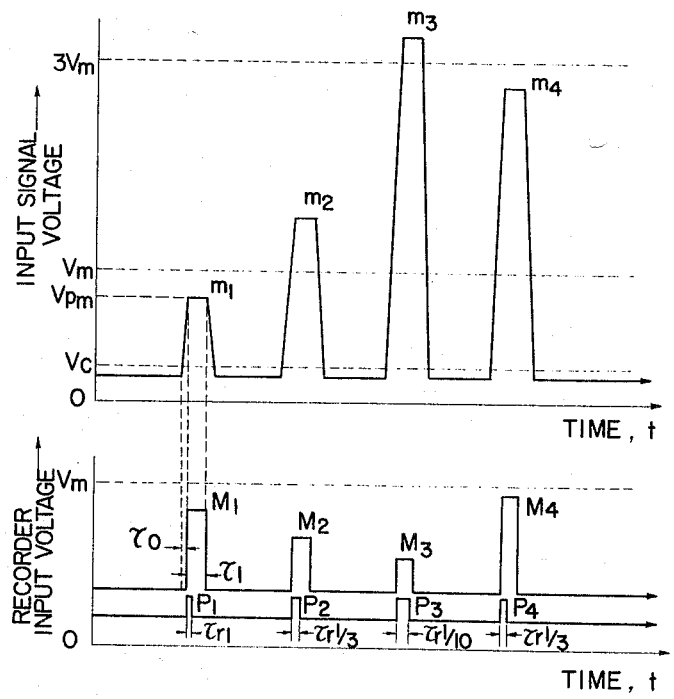

The foregoing objects and other objects and advantages as will presently become apparent have been achieved by the present invention, the nature, principles, and details of which will become more clearly apparent by reference to the following description, taken in conjunction with the accompanying drawings in which like parts are designated by like reference characters, and in which:

FIG. 1 is a block diagram illustrating one example of a sensitivity selection method and means of known type wherein an auxiliary collector is used;

FIGS. 2, 4, and 5 are block diagrams respectively showing preferred embodiments of the automatic sensitivity selector according to the invention; and FIGS. 3 and 6 are graphical representations indicating comparisons of signal pulse voltage and recorded peaks, presented for a description of the operation of the automatic sensitivity selector of the invention through correspondence thereof to the mass spectrum to be measured.

For a full appreciation of the nature and utility of the present invention, the following brief consideration of sensitivity selectors in general, including a description of difficulties inherent in those of conventional type, is believed to be necessary.

In the accompanying drawings, FIG. 1 shows a sensitivity selector in which a conventional auxiliary collector is used, and which comprises: a slit plate 1 with a slit S; a main collector 2; an auxiliary collector 3; a D.-C. amplifier 4; a resistor for selecting sensitivity 5; a recorder 6, a D.-C. amplifier 7; and a sensitivity selection controlling device 8.

In the operation of this conventional sensitivity selecting system, an incident ion beam which is caused to enter the slit S due to scanning of a magnetic field (for example $m_0$ in the drawing) first enters the auxiliary collector 3, the output signal of which, being amplified by means of the amplifier 7, thereby causes the controlling device 8 to be driven in accordance with the magnitude of the beam current, whereby the resistance value of the resistor 5 is selected to be at an appropriate value, and the recording sensitivity of the recorder 6 is suitably set.

Thereafter, the said ion beam $m_0$ is scanned and then enters the main collector 2, the output signal pulse thereof being amplified by the amplifier 4. The pulse so amplified then passes through the resistor 5 for selecting sensitivity which has been selected and set at an appropriate recording sensitivity state by means of the controlling device 8 due to an output signal pulse coming from the auxiliary collector 3, thereafter being recorded in the recorder 6 at the recording sensitivity set above. The said appropriate recording sensitivity means the highest sensitivity that can be selected without causing the tip portion of the spectrum to exceed the maximum scale limit of the recorder. This can be attained automatically by means of the controlling device 8 by detection of the magnitude of the output signal pulse of the auxiliary collector 3. Such a sensitivity condition so set as mentioned above will be maintained as long as the ion beam $m_0$ which has entered the slit S previously is still within the width of the slit S. The next ion beam $m_1$ is allowed to enter the auxiliary collector 3 after the said ion beam $m_0$ has left the slit S, the recording sensitivity being altered according to the magnitude of the said ion beam $m_1$ so that an appropriate sensitivity condition can be selected next. However, in a sensitivity selecting system in which an auxiliary collector of such a type is used, it is necessary to keep the distance between the ion beam $m_0$ and the ion beam $m_1$ immediately thereafter, i.e., the degree of mass dispersion $d$, always larger than the width of the slit S. Unless this condition is met, there will be an inconvenience such that, before the recording of the mass spectrum corresponding to the ion beam $m_0$ has been completed, the sensitivity will be switched due to the next incident ion beam $m_1$. Moreover, because of the fact that both the auxiliary collector and the main collector are to be installed within the slit S, the width of the slit S will inevitably become larger, with the result that it can be applied to only those having an increasingly large degree of mass dispersion $d$, thus resulting in such drawbacks as a substantial restriction in its uses and the necessity for two D.-C. amplifiers which are technically complicated.

An object of this invention is to provide an apparatus which is capable of effectively carrying out automatic sensitivity selection, even when the degree of mass dispersion is small, through the use of a single ion collector so as to eliminate the drawbacks named above.

Referring to the drawings, particularly FIG. 2, which is a block diagram showing an embodiment of an automatic sensitivity selector of this invention for use in mass spectrometers, it will be seen that a single ion collector 9 is provided at the rear of a small slit plate 1 with a slit S, whereby the collector output signal of the ion beam $m_0$ coming into said ion collector 9 is amplified by the amplifier 10, the output signal pulse voltage thereof being sent to an amplifier 11 and a resistor 16 for selecting sensitivity. The signal pulse voltage which has been sent to the amplifier 11 is then again amplified at this point to a sufficient voltage value, passes through a waveform discriminator 12, and drives a one-shot circuit 13, thus driving a relay 17 and closing the relay contact. In the meantime, a time delay $r_0$ is given by a delay circuit 14. On the other hand, a signal voltage which is produced in the sensitivity selecting resistor 16 is sent to a recorder 19 through the relay 17, but since said relay 17 is driven with the said time delay $r_0$, the signal voltage is not sent to the recorder 19 for the period of this $r_0$. The output signal voltage of the amplifier 11 drives, in accordance with the magnitude of the signal voltage, a circuit selected from a plurality of one-shot circuits 15, 15' and 15", whereby the resistance value of the sensitivity selecting resistor 16 is switched to an appropriate value corresponding to the magnitude of the signal voltage, and the signal voltage to be sent to the recorder 19 is converted into an appropriate magnitude (sensitivity). The time required for the selecting action and the delay time $\tau_0$ is so selected that the said selecting action can be completed within the delay time $\tau_0$. The time required for the selecting action can be rendered sufficiently short, for example, by adopting a so-called relay system wherein a relay is driven by the output of a one-shot circuit, thus selecting the connection of a resistance for change-over. When the sensitivity selecting action has been accomplished, and the relay 17 has been closed simultaneously with the elapse of the delay time $\tau_0$, the signal voltage is sent to the recorder 19 and thereby is recorded in an appropriate sensitivity condition which has been established. The signal which indicates the sensitivity at this time is produced by a sensitivity indicator 18 and is sent to the recorder 19, thereby being recorded simultaneously with the said signal voltage.

Assuming, for example, that recording sensitivity is to be selected in three stages in addition to a normal condition, then three one-shot circuits 15, 15' and 15" are provided as shown in FIG. 2, with appropriate differences being provided to the minimum input signal voltages for driving each of said circuits. Then the magnitude of the signal pulse voltage which has been sent to the recorder 19 from the amplifier 10 is detected in accordance with the magnitude of the signal pulse which has been sent from the amplifier 11, and three of the one-shot circuits are caused to be driven when the said signal pulse voltage has exceeded the full scale of the recorder 19 to a large extent, while two of said circuits are caused to be driven when the said excess is medium, and one circuit is driven when the excess is small. The output pulse of the one-shot circuits thus driven is sent to the sensitivity selecting resistor 16, whereby a selecting operation is carried out in such a manner that selection recording sensitivity is rendered either minimum, medium or maximum depending upon whether the signal pulse is large, medium or small.

Referring to FIG. 3 illustrating the above working conditions with reference to the observed ion peak, it will be seen that, if a large ion beam $m_0$ has been recorded as it is in the recorder 19 when the large current ion beam $m_0$ has been projected into the ion collector 9 as shown in the drawing, then the analysis will become impossible as a peak portion between the point $b$ and the point $e$ will be over-deflected. Thereupon, the apparatus of this invention as shown in FIG. 2 is used, whereby, when the rising portion of the output ion beam $m_0$ of the amplifier 10 has reached a predetermined voltage value $V_c$ (the point $a$) ($t_a$), the one-shot circuit 13 is caused to be driven and the output of said one-shot circuit 13 is put through a delay circuit 14 so that the contact of the relay 17 is caused to close at the time $tc$ after elapse of the delay time $\tau_0$ from the time $t_a$. During the delay time $\tau_0$, the ion beam $m_0$ reaches the peak value $V_p$. At the time ($t_b$) when it exceeds the full scale $V_m$ (the point $b$) of the recorder during the said period, a one-shot circuit, for example the first circuit 15, which is operable by the smallest input pulse, is caused to be driven, thereby causing the resistance connection of the sensitivity selecting resistor 16 to assume the first selected sensitivity state (for example sensitivity ½). This select- ing action is completed within the delay time $\tau_0$, and furthermore the said sensitivity state is maintained until after the final point $td$ of the return time $\tau_1$ of the relay 17, said time $\tau_1$ being determined by the waveform discriminator. Consequently, a mass spectrum to be recorded in the recorder 19 is a rectangular pulse form spectrum with a time width $\tau_1$ from the closing of the contact of the relay 17 until the re-opening of the same. It is possible to keep the peak thereof within the full scale of said recorder 19. In order to show the contrast between said ion beam $m_0$ and a spectrum $M_0$ on a recording sheet corresponding thereto, the working condition of the one-shot circuit 15 which has been driven is detected by means of a sensitivity indicator 18, and a corresponding sensitivity indicating signal is sent out, whereby the spectrum $M_0$ as well as a recording of a suitable type can be effected on the recording sheet of the recorder 19, said recording indicating the first selected sensitivity state (for example sensitivity ½).

When the recording has been completed by opening of the relay 17, the first selected sensitivity state which is to be maintained by means of the output pulse of the one-shot circuit 15 during the period of the pulse width thereof will return to its initial normal sensitivity state (the maximum sensitivity state) simultaneously with the falling of said pulse.

When a higher signal pulse voltage such as to cause the recorder 19 to over-deflect even in the first selected sensitive state as mentioned above enters, it should be so arranged that the second one-shot circuit can be driven when the signal pulse voltage in said first selected sensitivity state has reached a point where the recorder 19 is caused to over-deflect, whereby the resistance connection of the resistor 16 is switched to the second selected sensitivity state. Furthermore, even when a much larger signal pulse than the above is introduced, it is possible to have the number of sensitivity selection stages increased by the use of the third, fourth, . . . one-shot circuits in the same manner as above.

Referring to FIG. 4 showing a block diagram of another embodiment of the automatic sensitivity selector for mass spectrometers of this invention, it can be seen that a single ion collector 9 is provided, at the rear of a small slit plate 1, with a slit S, whereby the collector output signal pulse of an ion beam $m_0$ which has been projected into said ion collector 9 is caused to be amplified by means of a D.-C. amplifier 10, and the output signal pulse voltage thus amplified is further sent to an amplifier 11, a sensitivity selecting resistor 16, and a relay circuit 20. Upon arrival at the amplifier 11, the signal voltage is again amplified up to a sufficient voltage value and then is put into a Schmitt waveform discriminator 12 of the delay type having an integrating circuit inserted on the input terminal side, thereafter causing the contact of a relay 17 to close with a time delay of $\tau_0$ from the rising portion of the signal voltage.

The discriminator circuit 12 is identical with the "emitter coupling multivibrator circuit."

The signal voltage that has been sent from the amplifier 10 to the sensitivity selecting resistor 16 is caused to attenuate through an appropriate sensitivity selecting resistance connection within said resistor 16 so as to produce an adequate recording sensitivity and thereby is sent to the recorder 19 by way of said relay 17 which is caused to close with a time delay $\tau_0$ from the rising portion of the signal voltage. During this time delay $\tau_0$ the relay circuit 20 drives the required relays in accordance with the magnitude of the signal voltage and causes the resistance connection of the sensitivity selecting resistor 16 to be switched to a suitable sensitivity condition required according to the magnitude of the signal voltage. Upon completion of this sensitivity selecting action, the contact of the said relay 17 is caused to close simultaneously with the elapse of the delay time $\tau_0$, while the signal voltage is sent to the recorder 19 to be recorded in the state of the appropriate recording sensitivity that has been established. The recording sensitivity at this time can be caused to be memorized by detecting the action of the relay circuit 20 by means of the sensitivity indicator 18, thereby producing an appropriate sensitivity indicating signal corresponding thereto, and causing said indicating signal thus produced to be recorded on the recorder 19 simultaneously with said signal voltage.

The function of the relay circuit 20 is such that the recording sensitivity of a signal voltage which has been impressed directly onto the recorder 19 is caused to drop if the peak value of said signal voltage has exceeded the maximum scale of the recorder 19, so that the peak value thereof can be of an adequate value within the maximum scale of the recorder in its action. In said relay circuit 20 series resistances $R_1$, $R_2$ and $R_3$, as shown in FIG. 4, each having a different suitable value, are inserted in relays $Ry_1$, $Ry_2$ and $Ry_3$, respectively. Therefore, the number of relays to be driven differs according to the magnitude of the signal voltage. The resistance connection of the sensitivity selecting resistor 16 is caused to be switched according to the number of the relays thus to be driven to a corresponding sensitivity condition required.

The operating condition of the apparatus shown in FIG. 4 will now be explained further with reference to the observed mass spectrum shown in FIG. 3.

Assuming that a large signal voltage (peak value $V_p$), as shown by $m_0$ in the drawing, has been sent from the amplifier 10 to the recorder 19 directly as a result of projection of a large electric current beam, the spectrum of the ion beam $m_0$ to be recorded will exceed the maximum of the recorder 19, with the result that the spectrum portion between a point $b$ and a point $e$ will become overdeflected, thereby making the analysis impossible. However, when the automatic sensitivity selector of this invention as shown in FIG. 4 is used, the rising portion of the output ion beam $m_0$ of the amplifier 10 has reached an optionally selected voltage value $V_c$ (point $a$) ($t_a$), the integrating circuit which is inserted on the input terminal side of the Schmitt circuit 12 will start to function, thereby causing the Schmitt circuit to be triggered at a time $t_c$ which is delayed by $\tau_0$ from said time $t_a$, whereby the relay 17 is caused to close. On the other hand, during this delay time $\tau_0$, the ion-beam $m_0$ reaches a peak value $V_p$, while causing the first relay $Ry_1$ to be driven as it exceeds the maximum scale $V_m$ (point $b$) of the recorder ($t_b$), thereby causing the resistance connection of the sensitivity selecting resistor 16 to be changed over from the normal sensitivity (maximum sensitivity) to the first selected sensitivity condition (for example, sensitivity ½). Therefore, the ion beam $m_0$ becomes ½ in magnitude, which is sent to the recorder 19 through relay 17 with the elapse of $\tau_0$ ($t_c$), and thereby a mass spectrum $M_0$ of a rectangular form with a sensitivity at ½ will be recorded. The time width $\tau_1$ of said rectangular spectrum $M_0$ can be selected arbitrarily by suitably selecting the values C and R because, in the case of starting the triggering of the Schmitt circuit 12, if the input side of the integrating circuit is opened simultaneously with the starting of said triggering, with a charge voltage equal to the trigger starting voltage being discharged gradually through the CR discharging circuit simultaneously, then the Schmitt circuit will return to its original state when said discharge voltage has dropped by a voltage equal to the hysteresis voltage of the Schmitt circuit 12 from the trigger starting voltage ($t_d$), thereby causing the relay 17 to open again. Therefore, the spectrum $M_0$ to be recorded will return to the base line at the time $t_d$, thereby establishing a rectangular spectrum $M_0$. Upon completion of recording of this spectrum $M_0$ and the dropping of the ion beam $m_0$ below $V_m$ ($t_e$), the relay $Ry_1$ returns to normal, thereby bringing the resistance connection of the sensitivity selecting resistor 16 back to its normal sensitivity (maximum sensitivity) condition.

In the case when a much larger signal pulse capable of causing the recorder 19 to over-deflect even in the first selected sensitivity state as mentioned above, it is possible to keep the tip portion of the spectrum within the maximum scale of the recorder at all times by first causing the relay $Ry_1$ to be driven when the signal pulse has exceeded the maximum scale value $V_m$ of the recorder in the normal sensitivity condition, thereby switching the resistance connection of the sensitivity selecting resistor 16 to the first selected sensitivity state, and next causing the second relay $Ry_2$ to be driven when the signal pulse in the said first sensitivity state has exceeded the maximum scale value $V_m$ again, thereby switching the resistance connection of the sensitivity selecting resistance 16 to the second selected sensitivity state. In the case of entrance of signal pulses which are much larger than the above, the selection of sensitivity can be effected in the same manner by causing relays $Ry_3$, $Ry_4$, . . . to be driven.

The means of indicating the recording sensitivity with respect to each peak of mass spectrum in the automatic sensitivity selector of this invention as described above will now be explained. That is, in order to determine the recording sensitivity with which each spectrum peak has been recorded by using the above automatic sensitivity selector, it is necessary to have some kind of record which indicates the recording sensitivity for each of said spectrum peaks. Conventional systems which have been in use for the above purpose include, for example, the use of a recorder having the same number of marker pens (multiple elements) as the number of sensitivity selection stages, whereby the indication of recording sensitivity is effected by the number of marks which can be obtained by causing the marker pens, the number of which corresponds to the recording sensitivity at this time, to be driven simultaneously with the recording of the spectrum peaks, or else the use of a dual element recorder, whereby one element is used as the marker pen, thereby causing the magnitude of deflection of said element for use as a marker pen to correspond to the sensitivity state at that time. However, these conventional sensitivity indicating systems are disadvantageous from the view point of technology and economy in that in each case there are needed either a large number of marker pens or a multiple element recorder in effecting the recording.

The sensitivity indicating system to be described hereinafter is suitable for the practice of this invention and is capable of eliminating the above defects. In this system, a one-element recorder with a marker pen is used as the recorder, with the driving time of said marker pen corresponding to the sensitivity state at that time.

Referring to the accompanying drawings, FIG. 5 shows a block diagram which illustrates the fundamental construction of still another embodiment of this invention comprising a resistance attenuator 16 for use in sensitivity selection, Schmitt waveform discriminating circuits 22, 22' and 22'', relay switches 23, 23' and 23'', a one-shot multivibrator 24, a delay circuit 25, a relay switch 26, a one-element recorder 27 having a marker pen, a sensitivity indicating circuit 28 using a Schmitt circuit, a CR discharge circuit 29 for said circuit 28, and a relay 30 for driving the marker pen.

The input ion beam $m$ coming from an amplifier (not illustrated in the drawing) is made to pass successively through the resistance attenuator 16, the Schmitt waveform discriminators 22, 22' and 22'', and the one-shot multi-vibrator 24. Upon reaching the one-shot multivibrator 24, the input signal pulse $m$ drives the said vibrator 24 at the time when the rising portion thereof has become a predetermined voltage value $V_c$, while the output pulse thereof is caused to be delayed for a time $\tau_0$ by the delay circuit 25 and thereafter is sent to the relay switch 26, thereby driving said switch 26 and closing the switch contact $S_0$. On the other hand, during the period of delay $\tau_0$ the input signal pulse $m$ which has been sent to the Schmitt circuits 22, 22′ and 22″ reaches its peak value $V_p$. The Schmitt circuits 22, 22′ and 22″ are selected so that in the case when the peak value $V_{pm}$, of the input signal voltage is smaller than the maximum scale $V_m$ of the recorder 27, as shown by $m_1$ in FIG. 6, the Schmitt circuits 22, 22′ and 22″ are not driven. Hence, in such a case, none of the relay switches 23, 23′ or 23″ will be driven, while the input signal voltage $m_1$ that has been sent to the attenuator 16 passes, as it is, from a terminal with a sensitivity 1 through a switch contact $S_1$ thereafter passes through the switch contact $S_0$ which is closed with the abovementioned delay time $\tau_0$, and is then led to the recorder 27, thereby being recorded with a sensitivity 1. On the other hand, the capacitor C in the CR discharge circuit 29 in the sensitivity indicating circuit 28 is charged up to a predetermined voltage until such a time that the contact $S'_0$ has been switched by means of the relay switch 26. Since none of the relay switches 23, 23′ and 23″ is driven the discharge resistance R at this time is selected to be a value $R_1$ which corresponds to sensitivity 1. As soon as the input signal is sent to the recorder 27 through the switch contact $S_0$ when the relay switch 26 is driven after the elapse of the delay time $\tau_0$, the switch contact $S'_0$ is changed over from a terminal $a$ to a terminal $b$, whereby the charge voltage of the capacitor C will be discharged through a discharge resistance $R_1$ corresponding to the above sensitivity 1, thereby starting discharge with a time constant of $CR_1$. Thereupon, the base of a transistor $Tr_1$ in the Schmitt circuit 28, which has been in a conductive state, instantaneously assumes a positive potential, whereby the transistor $Tr_1$ assumes a cut-off state. In this case, the time $\tau r_1$ required for decrease of the base potential of said transistor with the discharge progression of said discharge circuit 29 and restoration of the conductive state of said transistor is dependent upon the time constant CR1 of the discharge circuit. During the period of this time $\tau r_1$, the relay 30 inserted in the collector side of the transistor $Tr_2$ is driven, thereby actuating the marker pen of the recorder 27. Then, there will be recorded a sensitivity indication mark $P_1$ which is to indicate by the driving time $\tau r_1$ that the recording sensitivity is 1, together with the said recorder input signal $M_1$ with sensitivity 1. As soon as the switch contact $S_0$ is opened upon the completion of the recording of the recorder input $M_1$ corresponding to the input signal $m_1$ after the output pulse width $\tau_1$ of the one-shot multi-vibrator 24 has been completed, the switch contact $S'_0$ also returns to its original state, thereby charging the capacitor C once agin. Thus, all of the sensitivity indicating circuits as a whole are reset each time when the recording of one input signal is completed.

On the other hand, in the case when an input signal pulse has such a large peak value that it exceeds the maximum scale of the recorder 27 with the sensitivity as it is, as shown, for example, by $m_2$ in FIG. 6, it is selected so that the first Schmitt circuit 22 is driven when the input signal voltage $m_2$ increases to the maximum scale value of the recorder. Then, the output pulse of the Schmitt circuit 22 drives the relay switch 23, whereby the switch contact $S_1$ of the attenuator 16 is caused, for example, to be switched to a terminal connected to sensitivity ⅓, thus setting the attenuation ratio at ⅓. Simultaneously, the switch contact $S'_1$ of the CR discharge circuit is caused ot open, whereby the discharge resistance R is switched to a value R/3 corresponding to sensitivity ⅓. Thereafter, the relay switch 26 is actuated and the switch contact $S_0$ is closed, simultaneously switching the contact $S'_0$ from the terminal $a$ to the side of terminal $b$, thereby actuating the relay 30. Thereupon, the input signal $m_2$ is attenuated by ⅓ and is recorded on the recorder 27 as a peak $M_2$. At the same time, a mark $P_2$ indicating that sensitivity is ⅓ is recorded by deflecting the marker pen for the period of time $\tau r \frac{1}{3}$ which is determined by the time constant CR⅓.

In the case of a still larger input signal, such as to exceed the maximum scale of the recorder 27 even when sensitivity is ⅓ (for example, $m_3$ in FIG. 3), the second Schmitt circut 22′ is caused to be driven when the input signal voltage exceeds a value three times that of $V_m$, the output pulse thereof causing the relay switch 23′ to operate, whereby the attenuator 16 is switched to a next stage (for example, to the stage of an attenuation ratio (A.R.) 1/10). Simultaneously, the discharge resistance R is switched to a next stage (A.R. 1/10) corresponding to the above switching of the attenuator. The number of stages that are to be changed-over can be arbitrarily selected according to the requirements.

As has been described above in detail, the sensitivity indication system of this invention is characterized in that the recorder whch records a series of input signal voltages, whose peak values vary within a wide range, is of a type having a single recording element with a single marker pen, and when an input signal voltage exceeds the maximum scale of said recorder, the said voltage is caused to attenuate to an appropriate value less than the maximum scale of the recorder, the voltage thus attenuated being recorded as a recorder input voltage, and, furthermore, simultaneously with said recording, the marker pen is caused to deflect for a period of time corresponding to said attenuation ratio so that the length of the driving time of said marker pen (which is in proportion to the length of the mark that is recorded) can indicate the attenuation ratio of the corresponding recorder input voltage. This is an advantageous feature in terms of economy and technology in that the recorder used can be a mono-element recorder with a single marker pen.

The automatic sensitivity selector of this invention having the above construction requires only one D.-C. amplifier due to its being of a single collector system type. Moreover, since the function of selecting a recording sensitivity can be completed very quickly for each peak of mass spectrum, there is no restriction such that the degree of mass dispersion $d$ must be larger than width of the slit S, as was customary with previous auxiliary collector systems. Hence, it has become possible to measure and record a spectrum with extremely small degree of mass dispersion in an adequate sensitivity condition.

In general, the mass spectrometer has heretofore had a limitation in that the value of $M/e$, i.e., ratio of the mass number to the electric charge of the component element of an analytical sample that can be measured, was more or less restricted due to the fact that the degree of dispersion thereof tends to become smaller with increase in the said $M/e$ value. However, the present invention has a further important advantage such that a substantial improvement in elevating the limitations of said $M/e$ value can be effectively attained.

Since it is obvious that many changes and modifications can be made in the above described details without departing from the nature and spirit of the invention, it is to be understood that the invention is not to be limited to the details described herein except as set forth in the appended claims.

What is claimed is:

1. An automatic sensitivity selector for a mass spectrometer recording system comprising
   (a) a single ion collector with two signal voltage pulse outputs;
   (b) a multiscale recorder;
   (c) time delay means having a predetermined time delay connected to one of the collector outputs;
   (d) switch means connected to the time delay means, adapted to be activated by the signal voltage pulse and to permit the intensity of the pulse to be recorded on the recorder;
   (e) sensitivity selecting means connected to the other of the collector outputs to select within the time delay period one of the scales on the multiscale recorder in accordance with the magnitude of the signal pulse to avoid off scale readings; and (f) means for connecting the input of the selected scale to the switch means so that the recorder will respond to the signal pulse.

2. The automatic sensitivity selector as defined in claim 1, wherein said switch means consist of a one-shot circuit driven by said signal voltage pulse, a delay circuit for imparting the delay time to the output control signal of the one-shot circuit, and a switch for transmitting the signal voltage pulse to the recorder, and driven by said delay means; and wherein said sensitivity selecting means consist of a one-shot circuit selectively driven in accordance with the magnitude of the pulse.

3. The automatic sensitivity selector as defined in claim 1, wherein said switch means consist of an integration circuit for integrating said signal voltage pulse, an emitter coupling multivibrator circuit to be triggered by the change voltage of said integration circuit, and a switch for transmitting said pulse from said ion collector to said recorder and driven by the output signal of said multivibrator circuit; and wherein said sensitivity selecting means consist of relay circuits driven in accordance with the magnitude of the signal voltage pulse.

4. The automatic sensitivity selector as defined in claim 1, wherein said switch means consist of a one-short circuit driven by the signal voltage pulse, a delay circuit for imparting the time delay to the output control signal of the one-shot circuit, and a switch for transmitting the pulse from the ion collector to the recorder and driven by the signal of the delay circuit; and wherein said sensitivity selecting means consist of an emitter coupling multivibrator circuit selectively driven in accordance with the magnitude of said pulse, relay switches driven by the output signals of the multivibrator circuit, and a resistance attenuator selecting the sensitivity required to convert the signal pulse from the ion collector to the required magnitude by means of said relay switches.

5. The sensitivity selector as defined in claim 1, wherein said recorder is provided with a marker pen; and said sensitivity selecting means deflect the marker pen according to the magnitude of the pulse, thereby indicating the corresponding recording sensitivity in terms of length of time during which the marker pen is deflected and simultaneously recording the pulse.

References Cited by the Examiner
UNITED STATES PATENTS

| | | | |
|---|---|---|---|
| 2,623,179 | 12/1952 | Neuland | 250—41.9 |
| 2,629,056 | 2/1953 | Goodwin | 250—41.9 |

RALPH G. NILSON, *Primary Examiner.*

W. F. LINDQUIST, *Assistant Examiner.*